United States Patent [19]

Heinrichs

[11] Patent Number: 4,848,173

[45] Date of Patent: Jul. 18, 1989

[54] MACHINE FOR MOVING WORKPIECES AND THE LIKE

[76] Inventor: Peter E. Heinrichs, Weinberstrasse 18, 6501 Sörgenloch, Fed. Rep. of Germany

[21] Appl. No.: 119,684

[22] Filed: Nov. 12, 1987

[30] Foreign Application Priority Data

Nov. 13, 1986 [DE] Fed. Rep. of Germany ... 8630404[U]

[51] Int. Cl.⁴ .................. F16H 27/02; F16H 35/02
[52] U.S. Cl. .................. 74/84 R; 74/89.17; 74/99 R; 74/109; 74/415; 74/422; 74/393; 74/600
[58] Field of Search .......... 74/89.17, 84 R, 99 R, 74/109, 422, 393, 600, 415

[56] References Cited

U.S. PATENT DOCUMENTS

| | | | |
|---|---|---|---|
| 522,252 | 7/1894 | Garrison | 74/422 X |
| 1,234,997 | 7/1917 | Allen | 74/393 X |
| 2,283,746 | 5/1942 | Lohs | 74/422 |
| 2,307,886 | 1/1943 | Hansson | 74/415 X |
| 2,509,161 | 5/1950 | Meyers | 74/422 |
| 2,920,501 | 1/1960 | Couch | 74/415 X |
| 2,961,879 | 11/1960 | Hudson | 74/84 R |
| 3,655,020 | 4/1972 | Van Slooten | 74/422 X |
| 4,580,462 | 4/1986 | Rehlander | 74/109 X |
| 4,622,793 | 11/1986 | Oki | 74/600 X |

*Primary Examiner*—Allan D. Herrmann
*Attorney, Agent, or Firm*—Michael I. Chakansky

[57] ABSTRACT

A machine for rhythmic and reciprocal movement of workpieces and the like in at least two successive steps is described. A carriage for moving the pieces has a drive in the form of at least two synchronously operating crank pins (12, 13), each engaging a groove (25, 26) of a slide track (24) fixed to the carriage (18-20) over about half the length of its travel. One step is thus executed. Then the crank pin in question (13) exits a groove (26) and the other crank pin (12) enters its groove (25). It then executes the second step. At the beginning of each step, the velocity of the carriage is zero. In the further course, it rises to a maximum at a crank angle of 90°, and drops back to zero at the end of the step. In this way an especially gentle and rapid motion is made possible. The crank pins may each be mounted on its own shaft, or they may be mounted together on a common shaft with an offset of 180°.

29 Claims, 5 Drawing Sheets

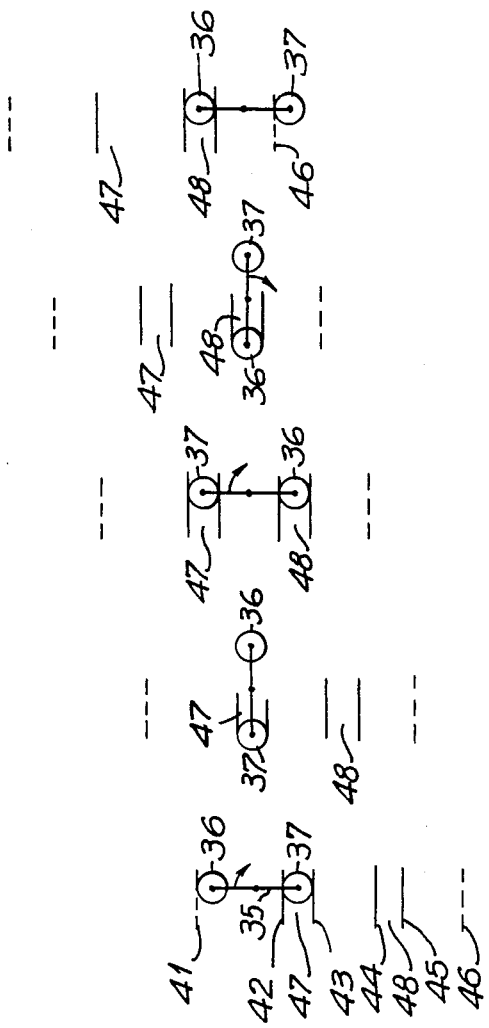

MACHINE FOR MOVING WORKPIECES AND THE LIKE

BACKGROUND OF THE INVENTION.

The invention relates to a machine for rhythmic and reciprocal movement of workpieces and the like in the least two successive steps, having a carriage guided along its trajectory to move the pieces, and a drive for the carriage.

For intermediate stations on transfer lines, for example in the manufacture of motor vehicles, hoisting means capable of lifting the work in two steps are required. For this purpose, in known manner, means operated by compressed air or hydraulic cylinders are employed, wherein a guided carriage is displaced by means of two cylinders acting successively. However, the outlay of energy in the use of compressed air or hydraulic cylinders is high, and noise is also a problem. Furthermore, abrupt starting and braking are troublesome in many cases. Similar problems arise with known machines that move workpieces or other parts horizontally or obliquely, for example sheet-metal parts in pressing or stamping.

The object of the invention, then, is to provide a machine for rhythmic and reciprocal movement or workpieces and the like permitting gentle and rapid movement of workpieces and the like, permitting gentle and rapid movement in two or more steps with small outlay and lower energy input.

SUMMARY OF THE INVENTION

To accomplish this object, the invention presupposes a machine of the kind initially mentioned, and is characterized in that the drive comprises at least two synchronously driven crank pins imprisoned over about half their travel in a groove of a common slide track fixed to the carriage, each executing one step of the operation, and in that, after one step has been executed by a crank pin, the latter exits its grooves and at the same time the other crank pin enters its groove and executes the second step.

The crank pins may be driven in simple manner by means of an electric motor or by any other drive system. At the beginning of each step, namely when a crank pin is entering its groove, the velocity of the carriage is zero. In the further course, the velocity increases up to a crank angle of 90° to a maximum and then declines once more to zero at the end of the step. Over all, this corresponds to a sinusoidal velocity curve.

The second step may be followed by additional steps, if additional crank pins and/or additional grooves of the common slide track are provided. The travels of the several steps may be comparatively long. They need not be of equal length, nor need they linearly adjoin each other. By selection of the carriage guidance and the location and arrangement of the crank pins and/or the grooves, any desired trajectories may be obtained.

In principle, when the invention is embodied, there is firstly the possibility that each crank pin may be disposed on a crank of its own and that each may have its own drive shaft, and that the drive shafts extend parallel to each other and are so arranged that the circular paths of the crank pins lie in the same plane, one following the other in the direction of motion of the carriage. The slide track is then passed on from crank pin to crank pin in the course of the steps of the process. Secondly, it may be provided that the crank pins are disposed at the two ends of a commonc crank. The two crank pins, in other words, are then 180° apart and have a common drive shaft. In the several steps of movement, the crank pins will then alternately engage the two grooves or, in additional steps, additional grooves of the common slide track. Alternatively, both possibilities may be combined.

In an embodiment of the invention according to the first possibility mentioned, the synchronization of the cranks, ensuring proper interlocking of the phases of motion as the cranks engage and disengage the grooves of the slide track, may be achieved in various ways, for example by coupling with the aid of a sprocket belt or chain. As a refinement of the invention, meshing gears of equal size may be rotationally fixed on the shafts of the cranks for this purpose. The cranks will then always move in proper phase relation to each other. One of the gears may be connected to a reduction motor by way of an additional, preferably smaller gear to provide the drive.

Instead of a counterrotation of the crank pins, a corotation may be employed if the grooves of the slide track are configured accordingly.

In further refinement of the first possibility, the invention purposes that the carriage have two parallel rods connected by a traverse top and bottom, each travelling in two guides fixed to a stationary housing, that the shafts or cranks be mounted parallel to each other in the housing, and that the drive of the shafts be arranged in the housing. In the case of higher required hoist or displacement force, the shafts of the cranks may protrude from the housing on both sides, where their cranks each drive a carriage with guided rods and traverses, the two carriages being additionally connected to a common carriage. This duplication of the drive, in addition to increased force and load capacity, provides symmetrical guidance on all four sides of the carriage.

Conveniently, the motor for the drive shaft or shafts or an interposed transmission may be provided with a brake so that the location of the carriage may be fixed at any desired point. At the dead centers, namely at the end or the beginning of any step, an automatic fixation of position is achieved, because the carriage is then held by the crank pins.

As a refinement of the invention, it is provided for both possibilities that the throw of the cranks is to be adjustable. Then the travels obtained in each step may be adapted to prevailing conditions.

To permit a basic setting, so that the beginning or the end of the travel may be adjusted to circumstances, the slide track may advantageously be movably mounted on the carriage, for example by means of screws passing through oblong holes, or with the aid of setscrews.

BRIEF DESCRIPTION OF THE DRAWINGS

Two embodiments of the invention will now be described with reference to the drawings by way of example. In the drawings.

FIGS. 5a–5e shows a schematic diagram of the steps in the action of the machine according to FIGS. 3 and 4.

Figure 1:
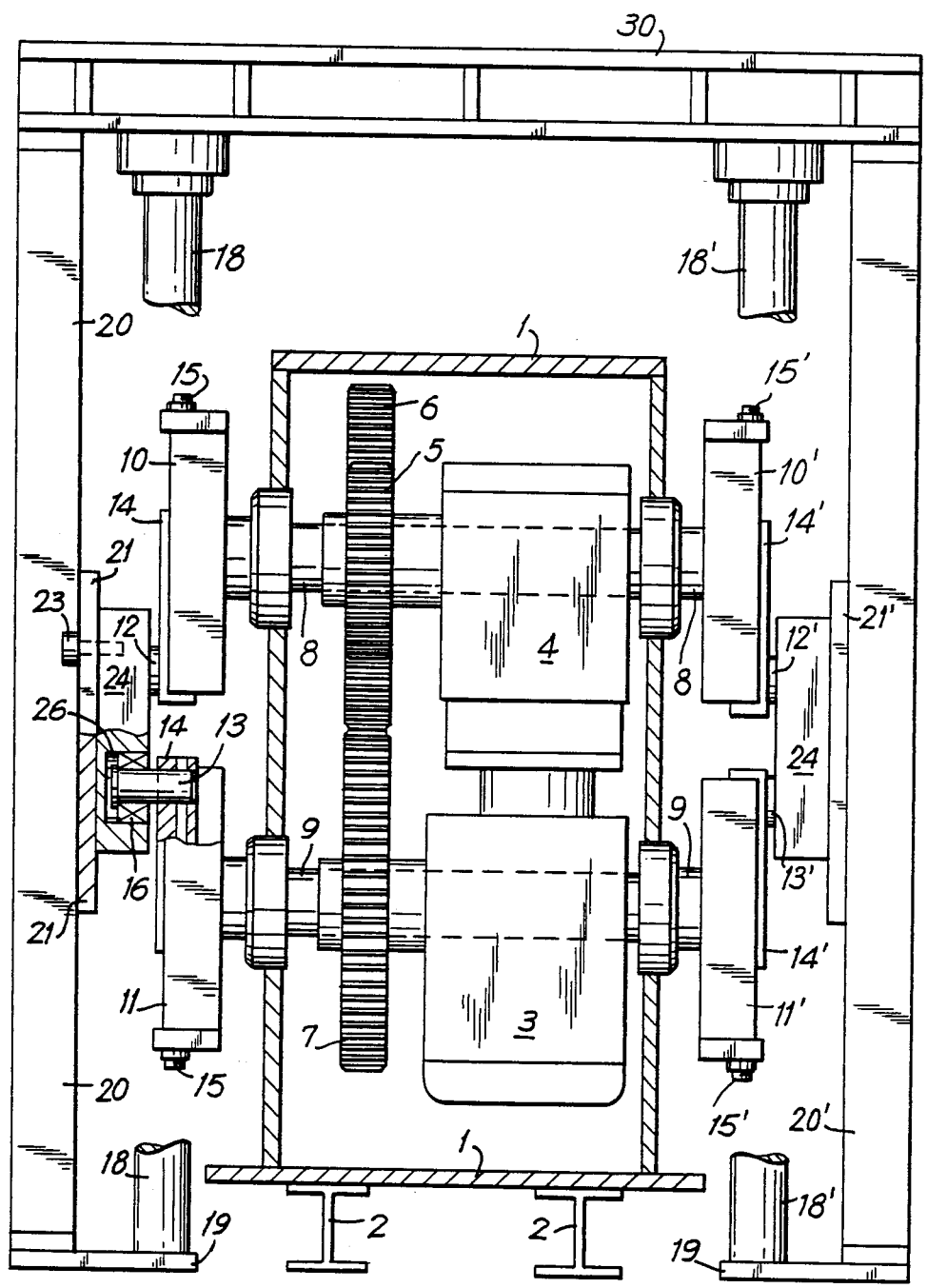
FIG. 1 shows a partly sectional side view of a first embodiment.

DESCRIPTION OF THE PREFERRED EMBODIMENTS.

The first embodiment by way of example, illustrating the first possibility defined above, will now be described with simultaneous reference to FIGS. 1 and 2. For simplicity of exposition, drive parts have been omitted in FIG. 2, as will be noted in detail.

A housing 1, shown in section, is mounted stationary on rails 2. According to circumstances, any other arrangement will be adopted. The housing contains an electric motor 3, which, by way of a transmission 4 shown schematically and a small gear 5, drives a larger gear 6 meshing in turn with a gear 7 of the same size. The two gears 6, 7 are rotationally fixed on shafts 8 and 9 respectively, mounted in the side walls of the housing 1. At their two ends, the shafts 8, 9 bear cranks 10, 11, and 10′, 11′ on the other side. All parts 1 to 11 thus far described have been omitted in FIG. 2 for simplicity.

On the cranks, crank pins 12, 13, and 12′, 13′ are arranged, adjusted in their radial distance from the shaft center lines by means of a slide 14, 14′. The slide may be adjusted by means of screws 15, 15′ shown schematically. At their free ends, the crank pins 12, 13 and 12′, 13′ are fitted with small rollers 16 on ball bearings.

On the housing 1, rods 18 are mounted and guided longitudinally displaceable in guides 17. At the top and bottom, traverses 19 connect the two rods 18. In the center between the rods 18, a tube 20 of rectangular cross section is arranged between the traverses 19. The tube 20, about in the middle, carries a plate 21 welded in place, with oblong holes 22. Through these oblong holes pass bolts 23, only one of which is shown in FIG. 1. With the help of these bolts 23, a slide track 24 may be fixed vertically adjustable on the plate 21.

The slide track has two parallel grooves 25 and 26, horizontal in the illustration, into which the rollers 16 of the crank pins 12, 13 can enter. To make this clearer, a portion of the tube 20 is shown broken away in FIG. 2.

Figure 2:
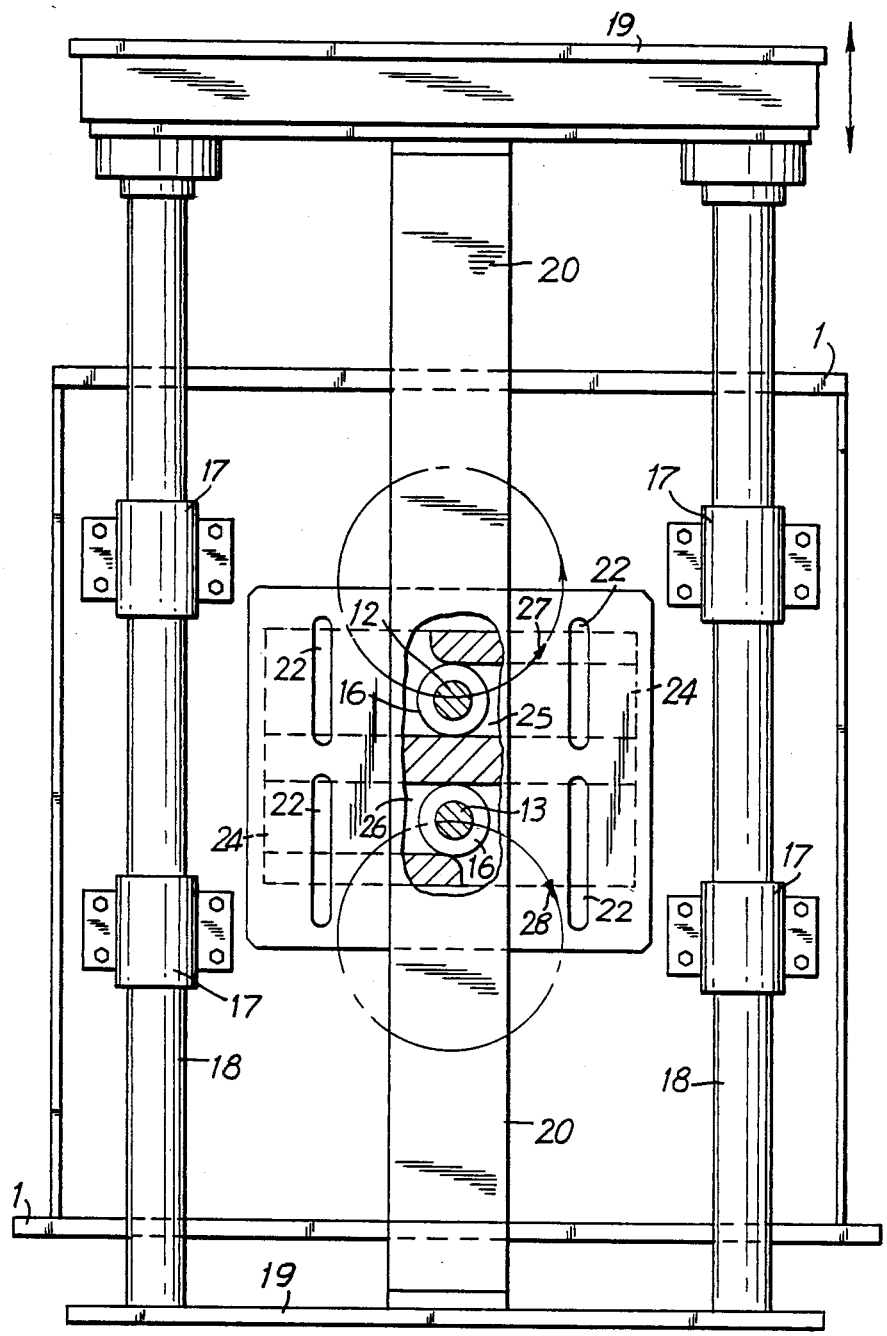
FIG. 2 shows a front view, rotated through 90°, of the machine according to FIG. 1.

In the position shown in FIGS. 1 and 2, the carriage 18–20 is located in intermediate position between the two possible raising or lowering steps. Now if the two gears 6, 7 and with them the cranks 10, 11 and 10′, 11′ (the description to follow applies to the parts with primed reference numerals likewise) are driven in the direction of the arrows 27, 28, the roller 16 of crank pin 13 will travel out of the groove 26. At the same time, roller 16 of crank pin 12 runs farther into its groove 25, lifting the slide track 24 and with it the entire carriage 18–20. Starting from velocity zero, the carriage thus accelerates, attaining its maximum velocity at a 90° angular setting of crank pin 12. Up to top dead center, the velocity then declines once more to zero, following a sinusoidal curve over all. Then if the cranks are rotated in the opposed direction again, the carriage 18–20 will be returned to the position shown. Upon further rotation in the same direction, that is, counter to the arrows 27 and 28, the roller 16 of crank pin 12 runs out of its groove 25, and at the same time roller 16 of crank pin 13 guides the slide track 24 to bottom dead center in another step of the process. Here again, the velocity of motion follows a sine function.

The strokes in the two steps can be adjusted by means of the slide 14 and screws 15. These settings must be made in the same direction, so that the two crank pins 12, 13 will maintain the distance seen in FIG. 2, matching the distance between the two grooves 25, 26.

As previously explained, the drive is duplicated on the two sides of housing 1, and the two sides in question are connected at the top by an additional traverse 30, so that the over-all effect is that of a hoisting platform guided on columns 18 at all four corners.

The second embodiment, representing the second possibility defined above, will now be described with reference to FIGS. 3 to 5. Where parts are the same as or similar to those in the first example, like reference numerals are used.

The machine shown is mounted stationary on a rigid beam 31. To the beam 31 is flanged a reduction motor 4, shown schematically, whose shaft 32 on one side drives a cam mechanism 34, likewise shown schematically, by way of a belt transmission 33, to control the several phases of motion. At the other end, the motor shaft 32 bears two crank pins 36, 37 with ball-bearing rollers 16 180° apart on a common crank 35.

A plate 40 provided with large openings 38, 39 (FIG. 4) and corresponding to the slide track 24 of the first embodiment according to FIGS. 1 and 2 bears parallel cleats 41 to 46. The cleats 42, 43 and 44, 45 define grooves 47, 48 between them to accommodate the rollers 16. Two additional cleats 21 and 46 serve as safeties, to be explained with reference to FIG. 5. The plate 40 can be fixed on both sides by being pressed against two columns 50 of rectangular cross section by means of stringers 49 and screws 51. The two columns 50 are connected by a traverse 19, comprising or carrying the hoist platform. After freeing of the screws 51, the plate 40 can be shifted in relation to the stringers 49 and columns 50 to set the initial and final locations.

Figure 3:
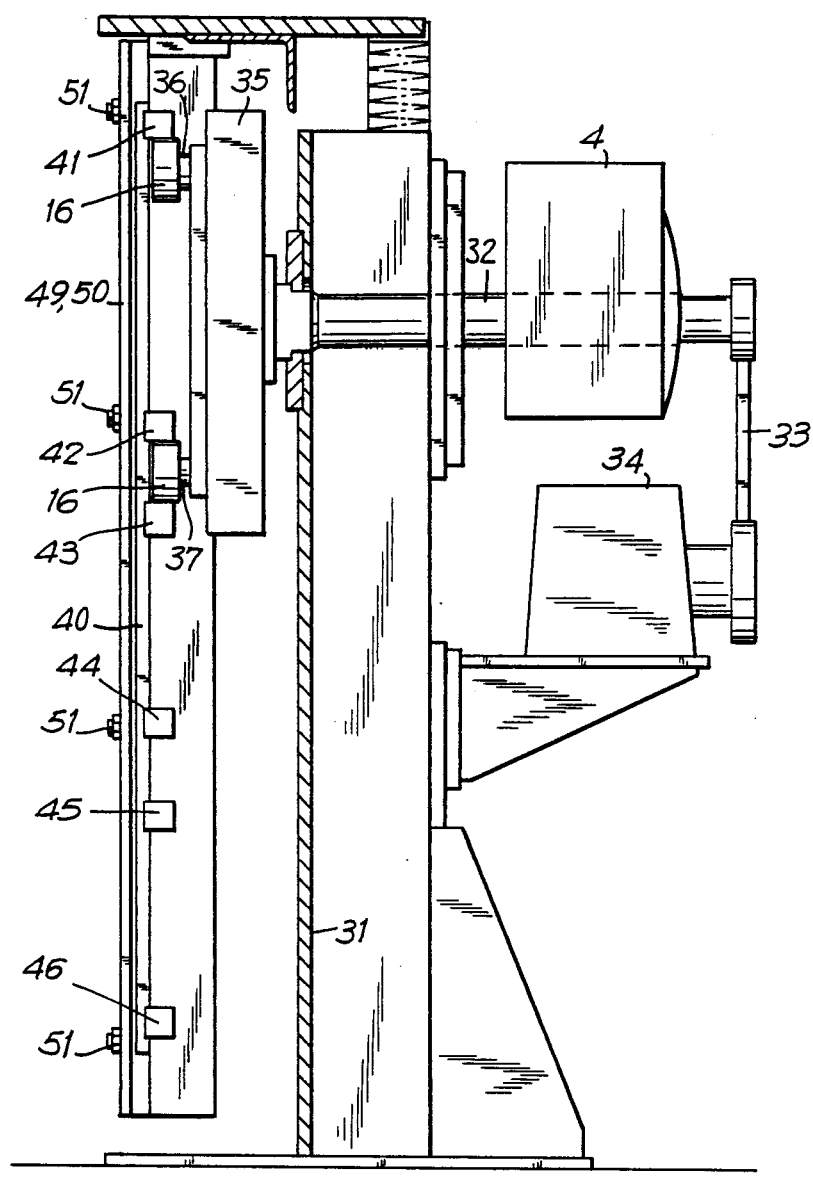
FIG. 3 shows a partly sectional side view of a second embodiment.
Figure 4:
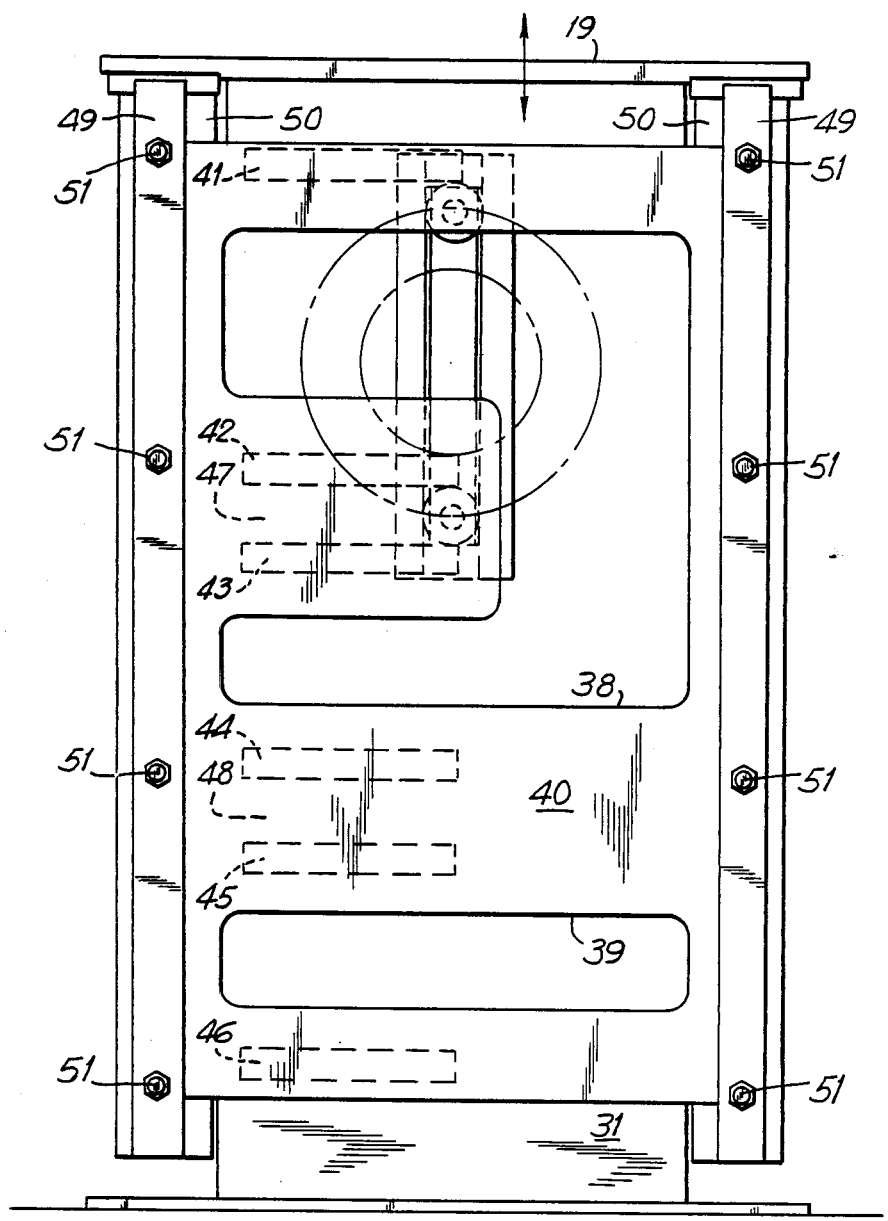
FIG. 4 shows a front view, rotated through 90°, of the machine according to FIG. 3.

The parts required to guide the carriage, consisting of parts 40, 49, 50, 19, have been omitted for simplicity in FIGS. 3 and 4. Guidance might for example be achieved much as in the first embodiment, by way of example, according to FIGS. 1 and 2.

In the position shown in FIGS. 3 and 4, the carriage 19, 40, 49, 50 is in its lowermost setting. This corresponds to the view in FIG. 5a. In this figure, the several phases of motion are represented schematically in terms of cleats 41–46 with grooves 47 and 48, crank 35 and the two crank pins 36, 37. If the crank 35 is turned in the direction of the arrows in FIGS. 5a–5e, after a rotation through 90° the position of FIG. 5b results. The carriage has then executed a half-step upward. After a further rotation through 90°, FIG. 5c, the first step has been completed. A further rotation of the crank 35, after 90°, yields the position of FIG. 5d, and after 180°, the final position of FIG. 5e. The carriage has then executed a total of two steps upwards. Downward steps are obtained by rotating the crank 35 counter to the arrows in FIG. 5. After a total rotation of 360°, the extreme lower position of FIG. 5a is regained.

If, in lowering the carriage, the crank 35 were to be rotated somewhat beyond the position of FIG. 5a, against the direction of the arrow shown, the roller 16 of crank pin 37 will come out of the groove 47. The carriage would then no longer be guided, were it not for the additional cleat 41. The same applies to the extreme top position of FIG. 5e. Here the additional cleat 46 secures the carriage when the crank 35 is rotated in the direction of the arrow beyond the final position, so that the crank pin 36 escapes from the groove 48.

In the embodiment according to FIGS. 3 to 5e likewise, a two-sided design like that of the embodiment according to FIGS. 1 and 2 could be adopted, to achieve the effect of a hoisting platform guided at all four corners.

While it is apparent that the invention herein described is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

I claim:

1. A machine for rhythmic and reciprocal movement of workpieces and the like in at least two successive steps, having a carriage guided along its trajectory to move the pieces and a drive for the carriage, characterized in that the drive comprises at least two synchronously driven crank pins (12, 13; 36, 37) imprisoned over about half their travel in a groove (25, 26; 47, 48) of a common slide track (24, 40) fixed to the carriage (18–20; 40, 49, 50), each of them executing one of the steps, and in that, after a step has been executed by a crank pin (13, 37), the later exists its groove (26, 47), and at the same time the respective other crank pin (12, 36) enters its groove (25, 48) and executes the second step of the motion, said carriage comprises two parallel rods (18) connected top and bottom by a traverse (19), each rod running in two guides (17) fixed to a stationary housing (1), in that the shafts (8, 9) of the cranks (10, 11) are mounted parallel to each other in the housing (1), and further characterized in that the drive (3, 4, 5, 6, 7) of the shafts (8, 9) is accommodated in the housing (1).

2. A machine according to claim 1, characterized in that each crank pin (12, 13) is arranged on a crank of its own (10, 11) having a drive shaft of its own (8, 9), and in that the drive shafts (8, 9) run parallel to each other and are so arranged that the circular paths of the crank pins lie in the same plane and one behind the other in the direction of the trajectory of the carriage (18–20).

3. A machine according to claim 2, characterized in that on the drive shafts (8, 9) of the cranks (10, 11), gears (6, 7) of like size meshing with each other are mounted rotationally fixed.

4. A machine according to claim 3, characterized in that one of the gears (6) may be driven by way of an additional gear (5) and a reduction motor (3, 4).

5. A machine according to any of claims 1–4, characterized in that the shafts (8, 9) of the crank (10, 11) protrude from the housing (1) on both sides and there each drives a carriage (18–20) by means of their cranks (10, 11; 10', 11') and in that the two carriages are joined to form a common carriage (30).

6. A machine according to any of claims 1–4, characterized in that the grooves (25, 26; 47, 48) run parallel to each other and perpendicular to the trajectory of the carriage (18–20; 40, 49, 50).

7. A machine according to any of claims 1–4, characterized in that the throw of the cranks (14, 15) is adjustable.

8. A machine according to any of claims 1–4, characterized in that the slide track (24, 40) is displaceably fixed to the carriage.

9. A machine for rhythmic and reciprocal movement of workpieces and the like in at least two successive steps, having a carriage guided along its trajectory to move the pieces and a drive for the carriage, characterized in that the drive comprises at least two synchronously driven crank pins (12, 13; 36, 37) imprisoned over about half their travel in a groove (25, 26; 47, 48) of a common slide track (24, 40) fixed to the carriage (18–20; 40, 49, 50), each of them executing one of the steps, and in that, after a step has been executed by a crank pin (13, 37), the latter exits its groove (26, 47), and at the same time the respective other crank pin (12, 36) enters its groove (25, 48) and executes the second step of the motion, and further characterized in that the throw of the cranks (14, 15) is adjustable.

10. A machine according to claim 9, characterized in that each crank pin (12, 13) is arranged on a crank of its own (10, 11) having a drive shaft of its own (8, 9), and in that the drive shafts (8, 9) run parallel to each other and are so arranged that the circular paths of the crank pins lie in the same plane and one behind the other in the direction of the trajectory of the carriage (18–20).

11. A machine according to claim 10, characterized in that on the drive shafts (8, 9) of the cranks (10, 11), gears (6, 7) of like size meshing with each other are mounted rotationally fixed.

12. A machine according to claim 11, characterized in that one of the gears (6) may be driven by way of an additional gear (5) and a reduction motor (3, 4).

13. A machine according to any of claims 9–12, characterized in that the slide track (24, 40) is displaceably fixed to the carriage.

14. A machine according to claim 9, characterized in that the crank pins (36, 37) are arranged at the two ends of a common crank (35), and in that the slide track (24, 40) is displaceably fixed to the carriage.

15. A machine for rhythmic and reciprocal movement of workpieces and the like in at least two successive steps, having a carriage guided along its trajectory to move the pieces and a drive for the carriage, characterized in that the drive comprises at least two synchronously driven crank pins (12, 13; 36, 37) imprisoned over about half their travel in a groove (25, 26; 47, 48) of a common slide track (24, 40) displaceably fixed to the carriage (18–20; 40, 49, 50), each of them executing one of the steps, and in that, after a step has been executed by a crank pin (13, 37), the later exits its groove (26, 47), and at the same time the respective other crank pin (12, 36) enters its groove (25, 48) and executes the second step of the motion.

16. A machine according to claim 15, characterized in that each crank pin (12, 13) is arranged on a crank of its own (10, 11) having a drive shaft of its own (8, 9), and in that the drive shafts (8, 9) run parallel to each other and are so arranged that the circular paths of the crank pins lie in the same plane and one behind the other in the direction of the trajectory of the carriage (18–20).

17. A machine according to claim 16, characterized in that on the drive shafts (8, 9) of the cranks (10, 11), gears (6, 7) of like size meshing with each other are mounted rotationally fixed.

18. A machine according to claim 17, characterized in that one of the gears (6) may be driven by way of an additional gear (5) and a reduction motor (3, 4).

19. A machine according to claim 15, characterized in that the crank pins (36, 37) are arranged at the two ends of a common crank (35).

20. A machine for rhythmic and reciprocal movement of workpieces and the like in at least two successive steps, having a carriage guided along its trajectory to move the pieces and a drive for the carriage, characterized in that the drive comprises at least two synchronously driven crank pins (12, 13; 36, 37) imprisoned over about half their travel in a groove (25, 26; 47, 48) of a common slide track (24, 40) fixed to the carriage (18–20; 40, 49, 50), each of them executing one of the steps, and in that, after a step has been executed by a crank pin (13, 37), the latter exits its groove (26, 47), and at the same time the respective other crank pin (12, 36) enters its groove (25, 48) and executes the second step of the motion, and further characterized in that the grooves (25, 26; 47, 48) run parallel to each other and perpendicular to the trajectory of the carriage (18-20; 40, 49, 50), and in that the throw of the cranks (14, 15) is adjustable.

21. A machine according to claim 20, characterized in that each crank pin (12, 13) is arranged on a crank of its own (10, 11) having a drive shaft of its own (8, 9), and in that the drive shafts (8, 9) run parallel to each other and are so arranged that the circular paths of the crank pins lie in the same plane and one behind the other in the direction of the trajectory of the carriage (18-20).

22. A machine according to claim 21, characterized in that on the drive shafts (8, 9) of the cranks (10, 11), gears (6, 7) of like size meshing with each other are mounted rotationally fixed.

23. A machine according to claim 22, characterized in that one of the gears (6) may be driven by way of an additional gear (5) and a reduction motor (3, 4).

24. A machine according to claim 20, characterized in that the crank pins (36, 37) are arranged at the two ends of a common crank (35).

25. A machine for rhythmic and reciprocal movement of workpieces and the like in a least two successive steps, having a carriage guided along its trajectory to move the pieces and a drive for the carriage, characterized in that the drive comprises at least two synchronously driven crank pins (12, 13; 36, 37) imprisoned over about half their travel in a groove (25, 26; 47, 48) of a common slide track (24, 40) fixed to the carriage (18–20); 40, 49, 50), each of them executing one of the steps, and in that, after a step has been executed by a crank pin (13, 37), the latter exits its groove (26, 47), and at the same time the respective other crank pin (12, 36) enters its groove (25, 48) and executes the second step of the motion, and further characterized in that the groove (25, 26; 47, 48) run parallel to each other and perpendicular to the trajectory of the carriage (18–20; 40, 49, 50), and in that the slide track (24, 40) is displaceably fixed to the carriage.

26. A machine according to claim 25, characterized in that each crank pin (12, 13) is arranged on a crank of its own (10, 11) having a drive shaft of its own (8, 9), and in that the drive shafts (8, 9) run parallel to each other and are so arranged that the circular paths of the crank pins lie in the same plane and one behind the other in the direction of the trajectory of the carriage (18-20).

27. A machine according to claim 26, characterized in that on the drive shafts (8, 9) of the cranks (10, 11), gears (6, 7) of like size meshing with each other are mounted rotationally fixed.

28. A machine according to claim 27, characterized in that one of the gears (6) may be driven by way of an additional gear (5) and a reduction motor (3, 4).

29. A machine according to claim 25, characterized in that the crank pins (36, 37) are arranged at the two ends of a common crank (35).

* * * * *